US008818983B1

(12) United States Patent
Truong

(10) Patent No.: US 8,818,983 B1
(45) Date of Patent: Aug. 26, 2014

(54) SYNCHRONIZATION OF SEARCH ENGINES

(75) Inventor: Steven Chi Truong, Montreal (CA)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 13/563,670

(22) Filed: Jul. 31, 2012

Related U.S. Application Data

(60) Provisional application No. 61/529,833, filed on Aug. 31, 2011.

(51) Int. Cl.
*G06F 17/30* (2006.01)
(52) U.S. Cl.
USPC .......... 707/706; 707/712; 707/713; 707/769; 707/796; 707/707
(58) Field of Classification Search
None
See application file for complete search history.

(56) References Cited

U.S. PATENT DOCUMENTS

| 6,516,321 | B1* | 2/2003 | De La Huerga | 1/1 |
| 7,620,658 | B2* | 11/2009 | Benson et al. | 1/1 |
| 8,073,839 | B2* | 12/2011 | Rathod | 707/713 |
| 2006/0036582 | A1* | 2/2006 | Sondergaard et al. | 707/3 |
| 2006/0106881 | A1* | 5/2006 | Leung et al. | 707/200 |
| 2008/0208919 | A1* | 8/2008 | i Dalfo et al. | 707/201 |
| 2009/0172773 | A1* | 7/2009 | Moore | 726/1 |
| 2011/0218964 | A1* | 9/2011 | Hagan et al. | 707/626 |
| 2012/0131037 | A1* | 5/2012 | Sinha | 707/769 |
| 2012/0203756 | A1* | 8/2012 | Biran et al. | 707/706 |

OTHER PUBLICATIONS

Arasu et al., Searchin the Web, 2001, University of Stanford, 42 pages.*
Czajkowski et al., Grid Information Services for Distributed Resource Sharing, 2001, University of Southern California, 14 pages.*

* cited by examiner

*Primary Examiner* — Noosha Arjomandi
(74) *Attorney, Agent, or Firm* — McDermott Will & Emery LLP

(57) ABSTRACT

A computer-implemented method for search engine synchronization is disclosed according to an aspect of the subject technology. The method comprises receiving, at a computing device, a search engine entry for a search engine, wherein the search engine entry comprises a keyword for invoking the search engine, and a globally unique identifier (GUID) uniquely identifying the search engine. The method also comprises determining whether there is a local search engine entry stored locally on the computing device with the same GUID as the received search engine entry, and, if there is a local search engine entry with the same GUID as the received search engine entry, then performing steps. The steps comprise determining whether the received search engine entry is newer than the local search engine entry, and, if the received search engine entry is newer, then replacing the local search engine entry with the received search engine entry.

15 Claims, 5 Drawing Sheets

SYNCHRONIZATION OF SEARCH ENGINES

CROSS-REFERENCE TO RELATED APPLICATION

The present application claims the benefit of U.S. Provisional Patent Application Ser. No. 61/529,833, entitled "Synchronization of Search Engines," filed on Aug. 31, 2011, which is hereby incorporated by reference in its entirety for all purposes.

FIELD

The subject disclosure generally relates to computing devices, and, in particular, to synchronizing information across multiple computing devices.

BACKGROUND

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices. Upon receiving the update from the server, each of the other computing devices may update its local copy of the information accordingly. As a result, changes made to the information at one computing device are reflected at the other computing devices.

SUMMARY

A computer-implemented method for search engine synchronization is disclosed according to an aspect of the subject technology. The method comprises receiving, at a computing device, a search engine entry for a search engine, wherein the search engine entry comprises a keyword for invoking the search engine, and a globally unique identifier (GUID) uniquely identifying the search engine. The method also comprises determining whether there is a local search engine entry stored locally on the computing device with the same GUID as the received search engine entry, and, if there is a local search engine entry with the same GUID as the received search engine entry, then performing steps. The steps comprise determining whether the received search engine entry is newer than the local search engine entry, and, if the received search engine entry is newer, then replacing the local search engine entry with the received search engine entry.

A machine-readable medium comprising instructions stored therein is disclosed according to an aspect of the subject technology. The instructions, which when executed by a machine, cause the machine to perform operations for search engine synchronization. The operations comprise generating, at a computing device, a search engine entry for a search engine, wherein the search engine entry comprises a keyword for invoking the search engine, an address corresponding to a remote search engine accessibly by the computing device over a network, and a globally unique identifier (GUID) uniquely identifying the search engine across a plurality of computing devices including the computing device. The operations also comprise sending the search engine entry to a sync server, wherein the sync server distributes the search engine entry to each of the other ones of the plurality of computing devices.

A system for search engine synchronization is disclosed according to an aspect of the subject technology. The system comprises one or more processors, and a machine-readable medium comprising instructions stored therein, which when executed by the one or more processors, cause the one or more processors to perform operations. The operations comprise receiving, at a computing device, a search engine entry for a search engine, wherein the search engine entry comprises a keyword for invoking the search engine. The operations also comprise determining whether there is a local search engine entry stored locally on the computing device with the same keyword as the received search engine entry, and, if there is a local search engine entry with the same keyword as the received search engine entry, then performing steps. The steps comprise determining whether the received search engine entry is newer than the local search engine entry, if the received search engine entry is newer, then changing the keyword of the local search engine entry, and, if the local search engine entry is newer, then changing the keyword of the received search engine entry.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A computing device may include one or more search engines, where each search engine provides the user with a shortcut to a corresponding remote search engine (e.g., web search engine) that is accessible via a network. Each search engine may include a keyword used to invoke the search engine and a search URL used to direct a search query from the user to the corresponding remote search engine.

It may be desirable to synchronize search engines across multiple computing devices used by the user. Synchronization of search engines would allow the user to add a search engine at any one of the computing devices and have the search engine automatically available at the other computing devices. Also, synchronization of search engines would allow the user to make changes to a search engine at any one of the computing devices and have the changes to the search engine automatically reflected at the other computing devices.

Systems and methods according to various aspects of the subject technology synchronize search engines across multiple computing devices. In one aspect, when a search engine is created at one of the computing devices, a globally unique identifier (GUID) is generated and assigned to the search engine. The GUID is used to uniquely identify the search engine globally to facilitate synchronization of the search engine across the multiple computing devices. In another aspect, systems and methods for resolving conflicts between conflicting search engines during synchronization are disclosed.

Figure 1:
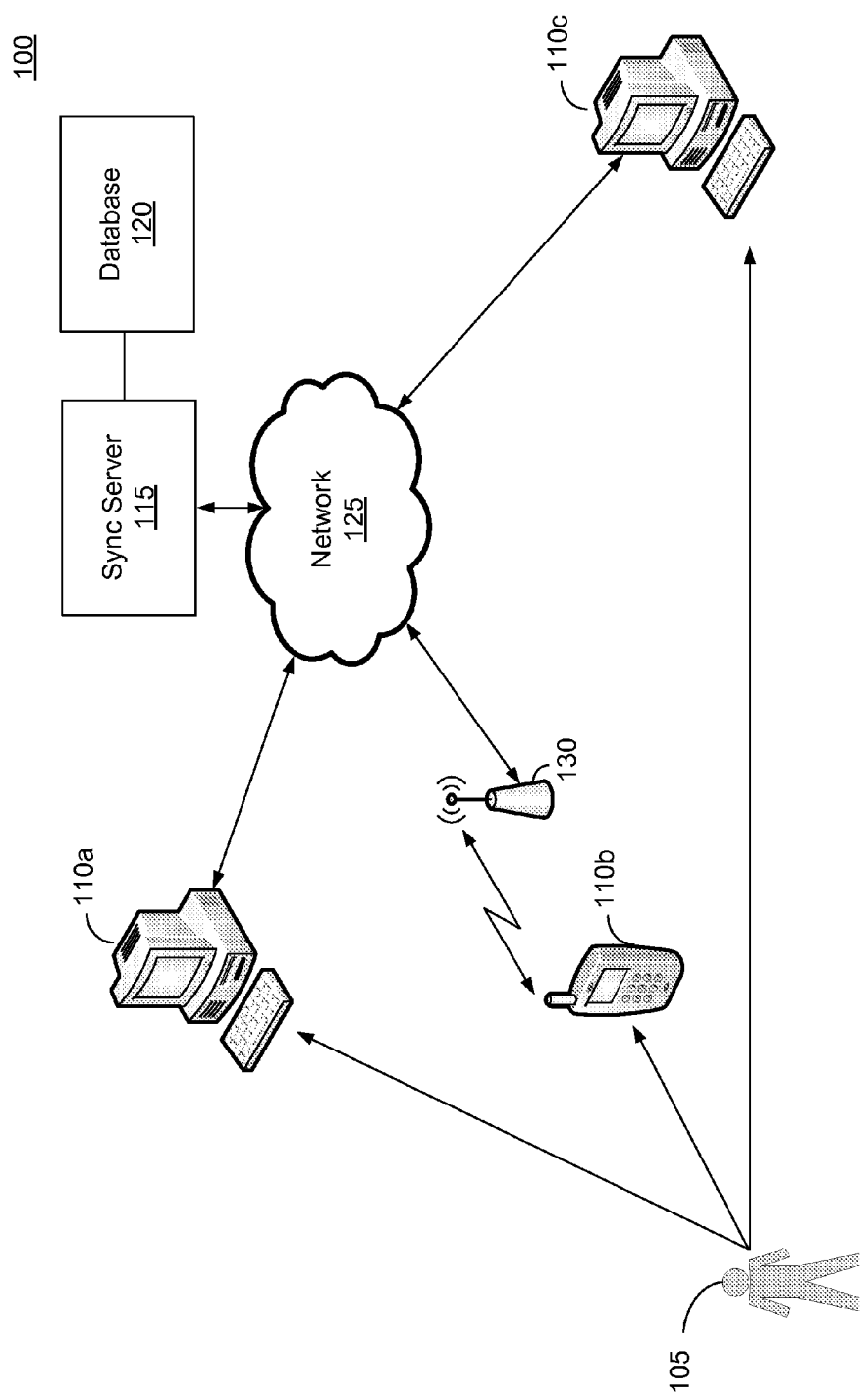
FIG. 1 is a conceptual block diagram of a system for synchronizing information across multiple computing devices according to an aspect of the subject technology.

FIG. 1 shows a system 100 for synchronizing browser information across multiple computing devices according to an aspect of the subject technology. The system 100 may comprise multiple computing devices 110a-110c, a sync server 115 and a database 120. Each computing device 110a-110c may be a laptop computer, a desktop computer, a tablet, a smart phone, a personal digital assistant (PDA), or other type of computing device. Each computing device 110a-110c may communicate with the sync server 115 over a network 125, for example, a local area network (LAN), a wide area network (WAN), an intranet and/or the Internet. In one aspect, one or more of the computing devices 110b may communicate with the network 125 via a wireless link (e.g., a WiFi wireless link, a cellular wireless link, etc.) with a base station or a wireless access point 130 connected to the network 125. While the system 100 is shown in one exemplary configuration in FIG. 1, it is to be understood that the system 100 may include additional or fewer computing devices.

In one aspect, each computing device 110a-110c may be configured to load and execute a web browser that allows a user 105 to retrieve and view web content from the network 125 (e.g., the Internet). Each computing device 110a-110c may store a local copy of browser information in a respective local memory. The browser information may comprise configuration and setting information for the web browser, browser history, and other information pertaining to the web browser. Examples of different types of browser information that may be used according to various aspects of the subject technology are provided below.

The browser information may include the user's browser preferences. The user's browser preferences may specify the home web page that is displayed in the browser window at startup. The user's browser preferences may also specify user selected browser settings.

The browser information may also include bookmarks for providing shortcuts to the user's favorite web pages, browser history including URLs of web sites visited by the user during one or more browser sessions, and a list of URLs typed into the address bar by the user. The browser information may also include tab information specifying web pages that are currently opened on the web browser, and theme information specifying a theme of the web browser (e.g., a custom background for the browser window).

The browser information may also specify one or more applications that are installed on the respective computing device 110a-110c. An application may be a web-based application that can be used within the web browser (e.g., to play a video from a web site). The browser information may also include one or more software extensions, each of which may comprise program code that adds additional functionalities to the web browser. The browser information may also include password information (e.g., user name and password) for logging onto one or more websites, and autofill data for filling out web forms.

The browser information may also include one or more search engines. A search engine may provide the user with a shortcut to a corresponding remote search engine (e.g., web search engine) that may be accessible through a website on the network 125 (e.g., the Internet). The search engine may include a keyword used to invoke the search engine and a search URL used to direct a search term (search query) from the user to the corresponding remote search engine. The search engine may enable the user 105 to send a search term to the corresponding remote search engine by typing the keyword and the search term into the address bar of the web browser. The respective computing device 110a-110c may recognize the keyword of the search engine in the address bar and invoke the search engine. The computing device 110a-110c may then direct the search term in the address bar to the remote search engine using the search URL specified by the search engine. The computing device 110a-110c may then receive search results from the remote search engine, and display the search results to the user 105 (e.g., on a search results web page).

Figure 2:
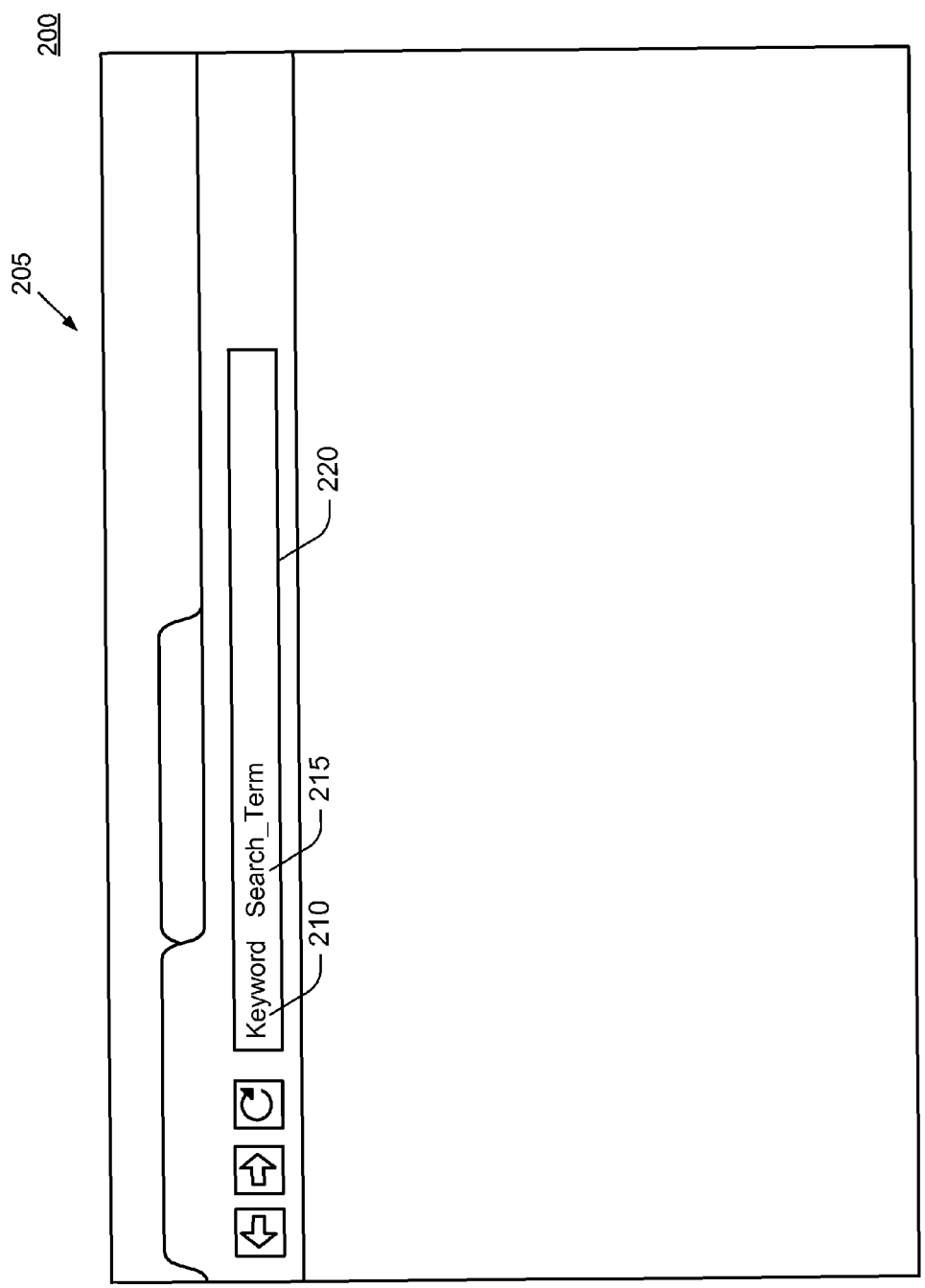
FIG. 2 shows an exemplary screenshot in which a search engine is invoked according to an aspect of the subject technology.

FIG. 2 shows an exemplary screenshot 200 of a web browser 205, in which the user types a keyword 210 and a search term 215 into the address bar 220 of the web browser 205 to perform a search. There may be a space between the keyword 210 and the search term 215. In this example, the keyword 210 invokes the corresponding search engine at the computing device 110a-110c. When the user hits enter, the computing device 110a-110c may direct the search term 215 to the corresponding remote search engine using the search URL specified by the search engine. The computing device 110a-110c may then display the search results from the remote search engine to the user.

A search engine may be defined by a search engine entry comprising a plurality of fields, where each field includes information specifying a parameter of the search engine. For example, the search engine entry may include a keyword field, a search URL field and a globally unique identifier (GUID) field. The keyword field includes a keyword that is used to invoke the search engine. For example, the user 105 may type the keyword into the address bar of the web browser to invoke the search engine. The keyword may be user defined or automatically generated by the computing device 110a-110c. The computing device 110a-110c may automatically generate the keyword based on a domain name of the website associated with the remote search engine (e.g., web search engine) or other method. Alternatively, the user may define the keyword, for example, by typing a desired keyword into a text box in a settings menu for the search engine. In one aspect, the computing device 110a-110c may prohibit the user from defining the same keyword for two different search engines on the computing device 110a-110c.

The search URL field includes a search URL. The search URL may be a URL associated with the corresponding remote search engine (e.g., web search engine). As discussed above, when the search engine is invoked and the user types a search term, the search term may be directed to the remote search engine using the search URL.

The GUID field includes a globally unique identifier (GUID) that uniquely identifies the search engine entry globally across the system 100. When the search engine entry is created, the respective computing device 110a-110c may generate the GUID using a GUID generator and assign the generated GUID to the search engine entry. The GUID may comprise a 32-character hexadecimal string or other character string. In one aspect, the GUID generator may be configured so that the probability of two computing devices 110a-110c independently generating the same GUID is extremely remote. This ensures that the GUID generated for the search engine entry is unique across the system 100 and therefore can be used to uniquely identify the search engine entry across the system 100.

The search engine entry may comprise additional fields including a creation field, a last modified field, and an input encoding field. The creation field may include a timestamp indicating the date and time that the search engine was created. The last modified field may include a timestamp indicating the date and time the search engine entry was last modified. The last modified field may be updated each time one or more fields of the search engine entry are modified. The input encoding field may include a string specifying the type of encoding (e.g., UCS transformation format 8-bit (UTF-8)) to be used to encode a search term entered by the user.

The search engine entry may also include a short name field, a favicon field, and an auto-replace field. The short name field may include a short description of the search engine. For example, the short description may identify a name of the website associated with the corresponding remote search engine (e.g., web search engine). The favicon field may include a favicon URL for retrieving a favicon of the website associated with the corresponding remote search engine (e.g., web search engine). The auto-replace field may include a flag indicating whether fields of the search engine entry may be automatically replaced by an automated system.

The search engine entry may also include a suggestion URL field, an instant URL field, and an originating URL field. The suggestion URL field may include a URL of a server that provides one or more suggested terms based on a partial or complete search term typed by the user 105. The computing device 110a-110c may use the URL in the suggestion URL field to access this server and provide the user with suggested terms when the user invokes the search engine. The instance URL field may include a URL of a server that performs a search before the user hits enter based on a partial or complete search term typed by the user 105 and provides one or more search results based on the search. The computing device 110a-110c may use the URL in the instance URL field to access this server and provide the user with instant search results when the search engine is invoked. The originating URL field may comprise a URL for retrieving an open search document (OSD) describing a web interface for the corresponding remote search engine (e.g., web search engine).

The search engine entry may also include a search term identifier field. The search term identifier field may include a search term identifier that is used to identify search terms stored locally on the computing device 110a-110c that the user previously typed using the search engine. For example, each time the user types a search term using the search engine, the computing device 110a-110c may store the search term in a portion of local memory identified with the search term identifier. This allows the computing device 110a-110c to quickly retrieve previous search terms that the user typed using the search engine. For example, when the user types a partial search term using the search engine, the computing device 110a-110c may use the search term identifier to locate previously typed search terms for the search engine, identify the previously typed search terms matching the partial search term, and display the matching search terms to the user 105. The user may then select one of the matching search terms (e.g., by clicking on the matching search term) instead of typing the entire search term. In one aspect, the GUID may also be used to identify previously typed search terms for the search engine, in which case a separate search term identifier may not be needed.

The search engine entry may also include a prepopulate identifier field, a policy field, and an auto-generate keyword field. The prepopulate identifier field may include an identifier that is used to uniquely identify a search engine that is preinstalled with the web browser. The policy field may include a flag indicating whether the search engine is subject to a policy (e.g., created by an administrator). For example, the policy may restrict the user 105 from deleting the search engine entry and/or modifying certain fields of the search engine entry. The auto-generate keyword field may include a flag indicating whether the keyword of the search engine can be automatically generated by the computing device.

It should be appreciated that the search engine entry for a search engine may include other fields. Further, the search engine entry may include a subset of the exemplary fields discussed above and/or additional fields.

It should also be appreciated that the subject technology is not limited to the exemplary browser information given above, and that other types of browser information may also be used in addition to or in the alternative to the exemplary browser information given above.

In one aspect, the sync server 115 is configured to synchronize browser information across the computing devices 110a-110c. The user 105 may use different ones of the computing devices 110a-110c for web browsing at different times. For example, the user 105 may use computing device 110a (e.g., a desktop or laptop computer) for web browsing at work and/or home, and use computing device 110b (e.g., a smart phone or tablet) for web browsing on the go. By synchronizing browser information across the computing devices 110a-110c, the user's browser information (e.g., browser preferences, theme, bookmarks, browser history, etc.) is available on any one of the computing devices 110a-110c.

Each computing device 110a-110c may connect to the sync server 115 over the network 125. For example, the user 105 may connect a computing device 110a-110c to the sync server 115 by logging onto the sync server 115 from the computing device 110a-110c. To do this, the user 105 may enter user credentials (e.g., user name, password, etc.) at the computing device 110a-110c and the computing device 110a-110c may send the user credentials to the sync server 115 over the network 125. If the sync server 115 authenticates the user based on the received user credentials, then the sync server 115 may grant the computing device 110a-110c access to a user account stored on the database 120. As discussed further below, a copy of the user's browser information may be stored in the user account to synchronize the computing devices 110a-110c. The user 105 may connect multiple computing devices 110a-110c to the sync server 115 at a time, for example, by logging onto the sync server 115 from each of the computing devices 110a-110c.

To establish initial synchronization among the computing devices 110a-110c, the user 105 may enable synchronization at computing device 110a, for example, by enabling a synchronization setting on the web browser. The user 105 may then log computing device 110a onto the user account at the server, for example, by entering user credentials at computing device 110a.

Upon successful login, computing device 110a may inform the sync server 115 that synchronization has been enabled. Computing device 110a may then send the browser information stored locally at computing device 110a to the sync server 115 over the network 125.

Upon receiving the browser information from computing device 110a, the sync server 115 may store the received browser information in the user account on the database 120. The browser information stored in the user account may be referred to as synchronization information or data.

When the user logs onto the sync server 115 from computing device 110b and enables synchronization at computing device 110b, the sync server 115 may send the browser information stored in the user account to computing device 110b over the network 125. When computing device 110b receives the browser information from the sync server 115, computing device 110b executes a synchronization process.

First, computing device 110b may compare the received browser information with browser information stored locally at computing device 110b. If the received browser information includes information (e.g., search engine entries, bookmark entries, autofill data, etc.) that is missing from the local browser information, then computing device 110b may update the local browser information to include the missing information. If the local browser information includes information (e.g., search engine entries, bookmark entries, autofill data, etc.) that is missing from the received local information, then computing device 110b may push the missing information to the sync server 115. In this case, the sync server 115 may update the browser information (synchronization information) in the user account with the missing information and push the missing information to computing device 110a so that computing device 110a can update its local browser information accordingly.

If some of the received browser information conflicts with some of the local browser information at computing device 110b, then computing device 110b may resolve the conflict according to a conflict-resolution policy. For example, each entry (e.g., search engine entry, bookmark entry, etc.) in the received browser information and the local browser information may be time stamped with the date and time that the entry was created and/or last modified. In this example, when a entry in the received browser information conflicts with an entry in the local browser information, computing device 110b may resolve the conflict in favor of the entry that was most recently created or modified. If the entry in the received browser information wins the conflict, then computing device 110b may replace the entry in the local browser information with the received entry. If the entry in the local browser information wins the conflict, then computing device 110b may push the entry in the local browser information to the sync server 115 with instructions to replace the corresponding entry in the user account with the entry from computing device 110b. In this case, the sync server 115 may push the entry from computing device 110b to computing device 110a. It should be appreciated that the subject technology is not limited to the exemplary conflict-resolution policy discussed above and that other types of conflict-resolution policies may be adopted. A method for resolving conflicts between conflicting search engine entries is discussed in detail below with reference to FIGS. 3A and 3B according to an aspect of the subject technology.

As a result of the synchronization process, the browser information at computing devices 110a and 110b and the browser information (synchronization information) in the user account are synchronized. The process described above may be repeated for each additional computing device that the user 105 desires to synchronize with the user account.

After the computing devices 110a-110c are initially synchronized, the sync server 115 may maintain synchronization among the computing devices 110a-110c. When the user 105 makes local changes to the browser information (e.g., the user adds, modifies and/or deletes one or more search engine entries) at any one of the computing devices 110a-110c, the computing device may send an update with the changes to the sync server 115. The sync server 115 may then update the browser information (synchronization information) stored in the user account based on the received update. As a result, the browser information stored in the user account is synchronized with the changes. The sync server 115 may then distribute the changes to each of the other computing devices 110a-110c so that each of the other computing devices can update its local browser information accordingly.

The system 100 may be used to synchronize search engines across the computing devices 110a-110c according to various aspects of the subject technology.

For example, a search engine may be created locally at computing device 110a. The user 105 may create the search engine at computing device 110a by specifying a keyword and a search URL for the search engine at computing device 110a. Alternatively, computing device 110a may automatically create the search engine when the user 105 visits a website and performs a search through the website. In this case, computing device 110a may specify a search URL for the search engine based on the URL of the website and may automatically generate a keyword for the search engine based on the domain name of the website.

Computing device 110a may then generate a corresponding search engine entry including the keyword and the search URL. Computing device 110a may also include one or more timestamps in the search engine entry indicating when the search engine entry was created and/or last modified. Computing device 110a may also generate a GUID to uniquely identify the search engine in the system 100 and include the GUID in the search engine entry. Computing device 110a may also specify other parameters of the search engine in any one of the fields discussed above. After generating the search engine entry, computing device 110a may store the search engine entry in local memory.

To synchronize the locally generated search engine entry across the system 100, computing device 110a may push (send) the search engine to the sync server 115 over the network 125. Upon receiving the search engine entry, the sync server 115 may store the received search engine entry in the user account. The sync server 115 may then push (send) the search engine entry to one or more of the other computing devices 110b and 110c. Upon receiving the search engine entry from the sync server 115, each of the other computing devices 110b and 110c may locally store the received search engine entry. As a result, the search engine generated locally at computing device 110a is available at each of the other computing devices 110b and 110c.

In the above discussion, it is assumed that the search engine entry generated at computing device 110a does not conflict with a search engine entry already stored at one of the other computing devices 110b and 110c. Various scenarios of conflicting search engine entries will be addressed later with reference to FIGS. 3A and 3B.

After the search engine is synchronized across the computing devices 110a-110c, the user 105 can modify the search engine at any one of the computing devices 110a-110c.

For example, the user 105 may modify the search engine at computing device 110b. The user 105 may modify the search engine, for example, by modifying the keyword of the search engine at computing device 110b. Computing device 110b may then update the search engine entry stored locally at computing device 110b accordingly. The update may include modifying the last-modified timestamp in the search engine entry to indicate when computing device 110b updated the search engine entry.

Computing device 110b may then push (send) the updated search engine entry to the sync server 115. Upon receiving the updated search engine entry, the sync server 115 may locate the copy of the search engine entry in the user account. The sync server 115 may do this by locating the search engine entry in the user account with a GUID matching the GUID in the received updated search engine entry. After locating the copy of the search engine entry in the user account, the sync server 115 may update the copy of the search engine entry in the user account according to the received updated search engine entry. As a result, the search engine entry in the user account is synchronized with the modification made at computing device 110b.

The sync server 115 may then push (send) the updated search engine entry to computing device 110a. Upon receiving the updated search engine entry, computing device 110a may locate its local copy of the search engine entry. Computing device 110a may do this by locating the search engine entry in local memory with a GUID matching the GUID in the received updated search engine entry. After locating its local copy of the search engine entry, computing device 110a may update its local copy of the search engine entry according to the received updated search engine entry. For example, computing device 110a may examine the last-modified timestamps in both the received updated search engine entry and its local copy of the search engine entry, and decide to update its local copy of the search engine entry when the last-modified timestamp in the received updated search engine entry is more recent. As a result, the search engine entry at computing device 110a is synchronized with the modification made at computing device 110b.

Figure 3A:
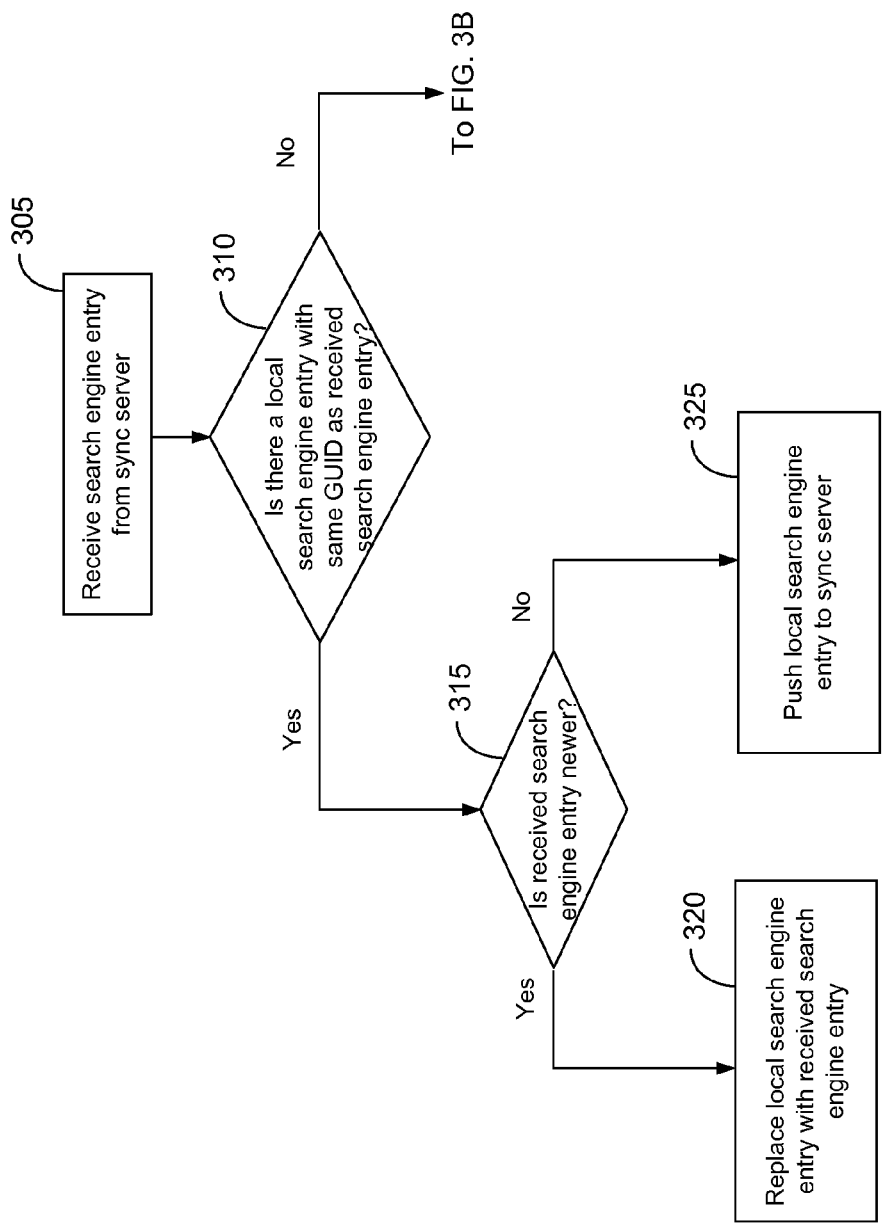
FIGS. 3A and 3B show a method for resolving conflicts between search engine entries according to an aspect of the subject technology.
Figure 3B:
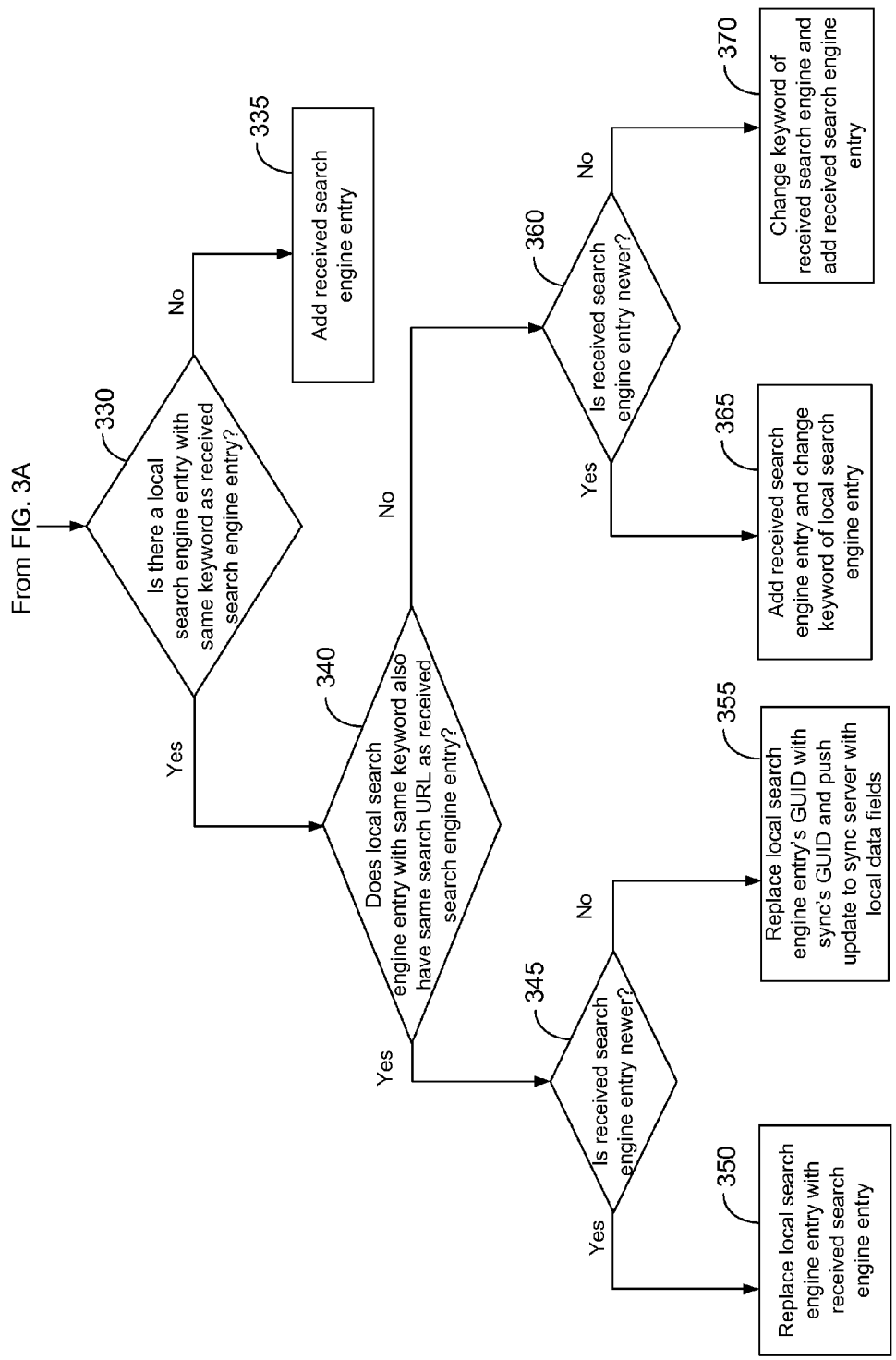

FIGS. 3A and 3B show a method for resolving conflict between conflicting search engine entries according to an aspects of the subject technology. The method may be performed by any one of the computing devices 110a-110c.

Referring to FIG. 3A, in step 305, the computing device 110a-110c receives a search engine entry from the sync server 115.

In step 310, the computing device 110a-110c determines whether there is already a search engine entry stored locally at the computing device 110a-110c with the same GUID as the received search engine entry. If there is a local search engine entry with the same GUID as the received search engine entry, then the computing device 110a-110c proceeds to step 315. If there is no local search engine entry with the same GUID as the received search engine entry, then the computing device 110a-110c proceeds to step 330 shown in FIG. 3B.

In step 315, the computing device 110a-110c determines whether the received search engine entry is newer than the local search engine entry with the same GUID. The computing device 110a-110c may do this by comparing the last-modified timestamps in the received search engine entry and the local search engine entry. The computing device 110a-110c may determine that the received search engine entry is newer when the last-modified timestamp in the received search engine entry is more recent that the last-modified timestamp in the local search engine entry.

If the received search engine entry is newer, then the computing device 110a-110c replaces the local search engine entry with the received search engine entry in step 320.

If the local search engine entry is newer, then the computing device 110a-110c pushes the local search engine entry to the sync server 115 in step 325 and does not change the local search engine entry. Upon receiving the local search engine entry, the sync server 115 may update the search engine entry with the same GUID in the user account according to the received local search engine entry. The sync server 115 may then push the received local search entry to the other computing devices 110a-110c.

Referring to FIG. 3B, in step 330, the computing device 110a-110c determines whether there is already a search engine entry stored locally at the computing device 110a-110c with the same keyword as the received search engine entry. If there is no local search engine entry with the same keyword as the received search engine entry, then the computing device 110a-110c adds the received search engine entry to the search engine entries stored locally at the computing device in step 335.

If there is a local search engine entry with the same keyword as the received search engine entry, then the computing device proceeds to step 340. In step 340, the computing device 110a-110c determines whether the local search engine entry with the same keyword also has the same search URL as the received search engine entry. If the local search engine entry with the same keyword also has the same search URL as the received search engine entry, then the computing device proceeds to step 345.

In step 345, the computing device 110a-110c determines whether the received search engine entry is newer than the local search engine entry with the same keyword and search URL. The computing device 110a-110c may do this by comparing the last-modified timestamps in the received search engine entry and the local search engine entry. The computing device 110a-110c may determine that the received search engine entry is newer when the last-modified timestamp in the received search engine entry is more recent that the last-modified timestamp in the local search engine entry.

If the received search engine entry is newer, then the computing device 110a-110c replaces the local search engine entry in local memory with the received search engine entry in step 350.

If the local search engine is newer, then the computing device 110a-110c replaces the local search engine entry's GUID with the sync's GUID (i.e., the GUID in the received search engine entry from the sync server 115) in step 355. The computing device 110a-110c then pushes the local search engine entry with the sync's GUID to the sync server 115 so that the information in the local search engine entry propagates across the system 100. The reason for adopting the sync's GUID in the local search engine entry is to avoid two search engine entries with duplicate keywords and search URLs in the system 100.

If the local search engine entry with the same keyword does not have the same search URL as the received search engine entry, then the computing device proceeds to step 360. In this case, there is a keyword conflict between the local search engine entry and the received search engine entry.

In step 360, the computing device 110a-110c determines whether the received search engine entry is newer than the local search engine entry with the same keyword. If the received search engine entry is newer, then the computing device adds the received search engine entry to the search engine entries stored locally at the computing device in step 365. The computing device also changes the keyword of the local search engine entry to avoid the keyword conflict. To do this, the computing device may generate a new keyword that is unique to the other search engine entries at the computing device and replace the keyword in the local search engine entry with the generated keyword. For example, the computing device 110a-110c may generate the new keyword by appending one or more characters to the end of the original keyword in the local search engine entry.

If the local search engine is newer, then the computing device 110a-110c may change the keyword in the received search engine entry to avoid the keyword conflict in step 370. To do this, the computing device may generate a new unique keyword and replace the keyword in the received search engine entry with the generated keyword. For example, the computing device 110a-110c may generate the new keyword by appending one or more characters to the end of the original keyword in the received search engine entry. The computing device 110a-110c may then add the received search engine entry with the new keyword to the search engine entries stored locally at the computing device. The computing device may also push the new keyword to the sync server 115 to update the corresponding search engine entry in the user account with the new keyword.

Figure 4:
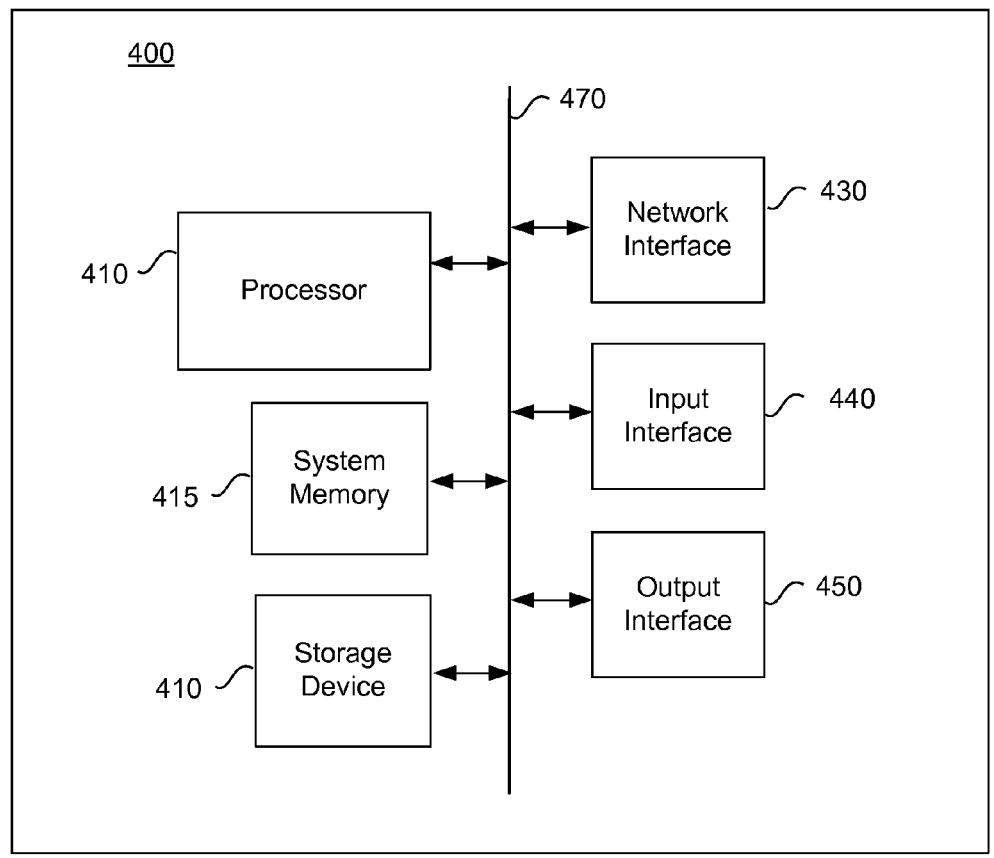
FIG. 4 conceptually illustrates an electronic system with which some implementations of the subject technology are implemented.

FIG. 4 conceptually illustrates an electronic system 400 with which some implementations of the subject technology are implemented. The electronic system 400 can be used to implement anyone of the computing devices 110a-110c shown in FIG. 1. While the electronic system 400 is shown in one configuration in FIG. 4, it is to be understood that the electronic system 400 may include additional, alternative and/or fewer components.

In the example shown in FIG. 4, the electronic system 400 includes a processor 410, system memory 415, a storage device 420, a network interface 430, an input interface 440, an output interface 450, and a bus 470. The bus 470 collectively represents all system, peripheral, and chipset buses that communicatively connect the numerous components of the electronic system 400. For instance, the bus 470 communicatively connects the processor 410 with the system memory 415 and the storage device 420. The processor 410 may retrieve instructions from one or more of these memories and execute the instructions to implement processes according to various aspects of the subject technology. The processor 410 may comprise a single processor or a multi-core processor in different implementations.

The storage device 420 may comprise a solid state drive, a magnetic disk, or an optical drive. The storage device 420 may be used to store an operating system (OS), programs, and/or files. The system memory 415 may comprise volatile memory (e.g., a random access memory (RAM)) for storing instructions and data that the processor 410 needs at runtime. Instructions for performing processes according to various aspects of the subject technology may be stored in the storage device 420 and loaded into the system memory 415 during runtime for execution by the processor 410. For example, a web browser application may be stored in the storage device 420 and loaded into the system memory 415 during runtime for execution by the processor 410. Also, the processor 410 may store local changes to the browser information in the system memory 415 and later write the local changes to the storage device 420 for long term storage of the changes. A local copy of the browser information may be stored in the system memory 415 and/or the storage device 420.

The network interface 430 enables the processor 410 to communicate with the sync server 115 over the network 125 (e.g., a local area network (LAN), a wide area network (WAN), an intranet, the Internet, etc.). The network interface 430 may include a wireless communication module for communicating with a base station or wireless access point 130 connected to the network 125 over a wireless link (WiFi wireless link, cellular wireless link, etc.).

The input interface 440 enables the user 105 to communicate information and commands to the processor 410. For example, the input interface 440 may be coupled to an alphanumeric keyboard and/or a pointing device (e.g., touch pad or mouse) to receive commands from the user 105.

The output interface 450 enables the processor 410 to communicate information to the user 105. For example, the output interface 450 may be coupled to a display (e.g., liquid crystal display (LCD)) and/or a printer to output information from the processor 410 to the user 105.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for search engine synchronization, the method comprising:
    receiving, at a computing device, a search engine entry for a search engine, wherein the search engine entry comprises a keyword for invoking the search engine, a globally unique identifier (GUID) uniquely identifying the search engine, and an address of the search engine;
    determining whether there is a local search engine entry stored locally on the computing device with the same GUID as the received search engine entry;
    if there is a local search engine entry with the same GUID as the received search engine entry, then performing the steps of:
        determining whether the received search engine entry is newer than the local search engine entry; and
        if the received search engine entry is newer, then replacing the local search engine entry with the received search engine entry;
    if there is no local search engine entry with the same GUID as the received search engine entry, then performing the steps of:
        determining whether there is a local search engine entry stored locally on the computing device with the same keyword as the received search engine entry;
        if there is no local search engine entry with the same keyword as the received search engine entry, then adding the received search engine entry to the computing device;
        if there is a local search engine entry with the same keyword as the received search engine entry, then determining whether the local search engine entry has the same address as the received search engine entry;
        if the local search engine entry has the same address as the received search engine entry, then performing the steps of:

determining whether the received search engine entry is newer than the local search engine entry;

if the received search engine entry is newer, then replacing the local search engine entry with the received search engine entry; and if the local search engine entry is newer, then replacing a GUID of the local search engine entry with the GUID of the received search engine entry.

2. The method of claim 1, wherein each of the received search engine entry and the local search engine entry comprises a last-modified field indicating a date that the respective search engine entry was last modified, and wherein determining whether the received search engine entry is newer than the local search engine entry comprises comparing the last-modified field of the received search engine entry with the last-modified field of the local search engine entry.

3. The method of claim 1, further comprising, if the local search engine entry is newer, then sending, to a sync server, the local search engine entry, wherein the sync server pushes the received local search engine entry to one or more other computing devices.

4. The method of claim 1, further comprising:

if the local search engine entry does not have the same address as the received search engine entry, then performing the steps of:

determining whether the received search engine entry is newer than the local search engine entry;

if the received search engine entry is newer, then changing the keyword of the local search engine entry; and if the local search engine entry is newer, then changing the keyword of the received search engine entry.

5. The method of claim 4, further comprising, if the keyword of the received search engine entry is changed, then sending the changed keyword to a sync server, wherein the sync server pushes the changed keyword to one or more other computing devices.

6. The method of claim 1, wherein the received search engine entry comprises an address corresponding to a remote search engine, and the method further comprises, when a user enters the keyword and a search query in a web browser at the computing device, sending the search query to the remote search engine using the address.

7. The method of claim 6, wherein the address comprises a uniform resource locator (URL).

8. A system for search engine synchronization, the system comprising:

one or more processors; and a machine-readable medium comprising instructions stored therein, which when executed by the one or more processors, cause the one or more processors to perform operations comprising:

receiving, at a computing device, a search engine entry for a search engine, wherein the search engine entry comprises a keyword for invoking the search engine, a globally unique identifier (GUID) uniquely identifying the search engine, and an address of the search engine;

determining whether there is a local search engine entry stored locally on the computing device with the same GUID as the received search engine entry;

if there is a local search engine entry with the same GUID as the received search engine entry, then performing the steps of:

determining whether the received search engine entry is newer than the local search engine entry; and if the received search engine entry is newer, then replacing the local search engine entry with the received search engine entry;

if there is no local search engine entry with the same GUID as the received search engine entry, then performing the steps of:

determining whether there is a local search engine entry stored locally on the computing device with the same keyword as the received search engine entry;

if there is no local search engine entry with the same keyword as the received search engine entry, then adding the received search engine entry to the computing device;

if there is a local search engine entry with the same keyword as the received search engine entry, then determining whether the local search engine entry has the same address as the received search engine entry;

if the local search engine entry has the same address as the received search engine entry, then performing the steps of:

determining whether the received search engine entry is newer than the local search engine entry;

if the received search engine entry is newer, then replacing the local search engine entry with the received search engine entry; and if the local search engine entry is newer, then replacing a GUID of the local search engine entry with the GUID of the received search engine entry.

9. The system of claim 8, wherein each of the received search engine entry and the local search engine entry comprises a last-modified field indicating a date that the respective search engine entry was last modified, and wherein determining whether the received search engine entry is newer than the local search engine entry comprises comparing the last-modified field of the received search engine entry with the last-modified field of the local search engine entry.

10. A non-transitory machine-readable medium comprising instructions stored therein, which when executed by a machine, cause the machine to perform operations for search engine synchronization, the operations comprising:

receiving, at a computing device, a first search engine entry for a search engine, wherein the first search engine entry comprises a keyword for invoking the search engine, a globally unique identifier (GUID) uniquely identifying the search engine, and an address of the search engine;

determining whether there is a local search engine entry stored locally on the computing device with the same GUID as the received first search engine entry;

if there is a local search engine entry with the same GUID as the received first search engine entry, then performing the steps of:

determining whether the received first search engine entry is newer than the local search engine entry; and if the received first search engine entry is newer, then replacing the local search engine entry with the received first search engine entry;

if there is no local search engine entry with the same GUID as the received first search engine entry, then performing the steps of:

determining whether there is a local search engine entry stored locally on the computing device with the same keyword as the received first search engine entry;

if there is no local search engine entry with the same keyword as the received first search engine entry, then adding the received first search engine entry to the computing device;

if there is a local search engine entry with the same keyword as the received first search engine entry, then determining whether the local search engine entry has the same address as the received first search engine entry;

if the local search engine entry has the same address as the received first search engine entry, then performing the steps of:

determining whether the received first search engine entry is newer than the local search engine entry;

if the received first search engine entry is newer, then replacing the local search engine entry with the received first search engine entry; and if the local search engine entry is newer, then replacing a GUID of the local search engine entry with the GUID of the received first search engine entry.

11. The non-transitory machine-readable medium of claim 10, wherein the operations further comprise:

generating, at a computing device, a second search engine entry for the search engine, wherein the second search engine entry comprises a keyword for invoking the search engine, an address of the search engine, and a globally unique identifier (GUID) uniquely identifying the search engine across a plurality of computing devices including the computing device; and sending the second search engine entry to a sync server, wherein the sync server distributes the second search engine entry to each of the other ones of the plurality of computing devices.

12. The non-transitory machine-readable medium of claim 11, wherein the operations further comprise automatically generating the second search engine entry when the user accesses the address of the search engine from the computing device.

13. The non-transitory machine-readable medium of claim 12, wherein the operations further comprise automatically generating the keyword based on a domain name associated with the address of the search engine.

14. The non-transitory machine-readable medium of claim 11, wherein the operations further comprise, when a user enters the keyword and a search query in a web browser at the computing device, sending the search query to the address of the search engine.

15. The non-transitory machine-readable medium of claim 14, wherein the address comprises a uniform resource locator (URL).

\* \* \* \* \*